United States Patent [19]

Saderholm

[11] Patent Number: 5,520,409
[45] Date of Patent: May 28, 1996

[54] COVER RETENTION IN OCCUPANT RESTRAINT INSTALLATIONS

[75] Inventor: Davin G. Saderholm, Salt Lake City, Utah

[73] Assignee: Morton International, Inc., Chicago, Ill.

[21] Appl. No.: 991,014

[22] Filed: Dec. 15, 1992

[51] Int. Cl.$^6$ ............................................. B60R 21/16
[52] U.S. Cl. ........................... 280/728.2; 280/731; 156/85; 156/86
[58] Field of Search .................. 280/728 R, 728 A, 280/730 R, 732, 728 B, 731, 728.1, 728.2, 730.1, 728.3; 206/497; 156/85, 86; 264/342 R

[56] References Cited

U.S. PATENT DOCUMENTS

| | | | |
|---|---|---|---|
| 825,116 | 7/1906 | Engels | 206/497 |
| 3,331,105 | 7/1967 | Gordon | 206/497 |
| 3,653,497 | 4/1972 | Hornstein | 206/497 |
| 3,656,790 | 4/1972 | Truesdell | 280/728 A |
| 3,853,334 | 12/1974 | Auman et al. | 280/728 B |
| 4,016,807 | 4/1977 | Schellenberg | 206/497 |
| 4,036,138 | 7/1977 | Chopra et al. | 206/497 |
| 4,101,292 | 7/1978 | Hogan, II | 206/497 |
| 4,111,457 | 9/1978 | Kob et al. | 280/728 |
| 4,206,706 | 6/1980 | Steele | 206/497 |
| 4,334,699 | 6/1982 | Patzelt et al. | 280/731 |
| 4,561,675 | 12/1985 | Adams et al. | 280/736 |
| 4,747,896 | 5/1988 | Anastasie | 156/85 |
| 4,989,897 | 2/1991 | Takada | 280/743 |
| 5,048,708 | 9/1991 | Musco | 206/497 |
| 5,062,661 | 11/1991 | Winget | 280/728 B |
| 5,064,217 | 11/1991 | Shiraki | 280/743 |
| 5,074,584 | 12/1991 | Jarboe | 280/743 |
| 5,074,585 | 12/1991 | Satoh | 280/743 |
| 5,110,647 | 5/1992 | Sawada et al. | 280/728 B |
| 5,174,602 | 12/1992 | Nakayama | 280/728 B |

FOREIGN PATENT DOCUMENTS

| | | | |
|---|---|---|---|
| 3545028 | 7/1977 | Germany | 280/728 B |
| 1-160757 | 6/1989 | Japan | 280/728 A |
| 2-133266 | 5/1990 | Japan | 280/728 A |

Primary Examiner—Karin L. Tyson
Attorney, Agent, or Firm—Nick C. Kottis; Gerald K. White

[57] ABSTRACT

A method and assembly resulting in improved cover to housing retention in occupant restraint assemblies is disclosed. The improved retention is realized via the appropriate application and use of a band of heat shrinkable material about the assembly.

20 Claims, 3 Drawing Sheets

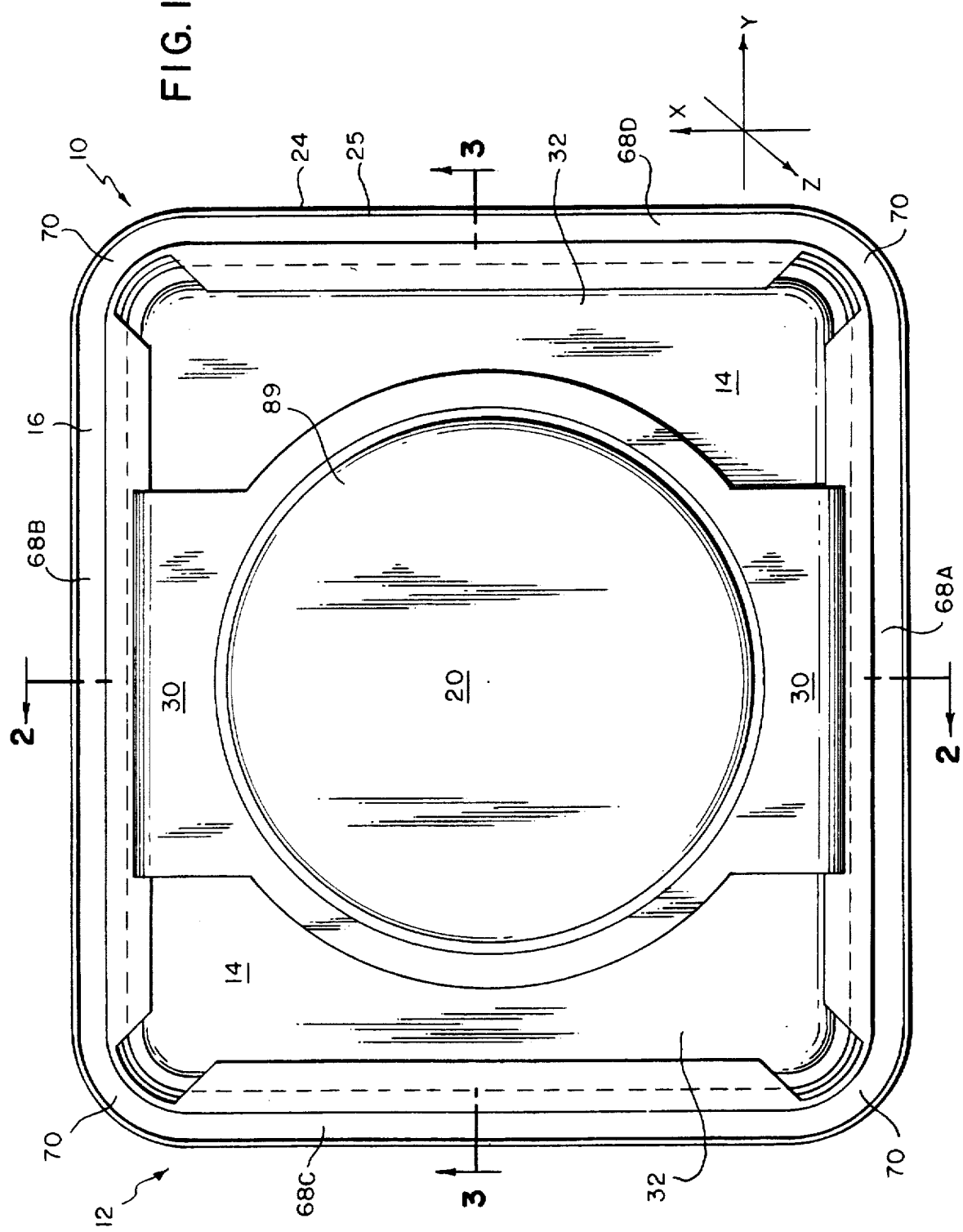

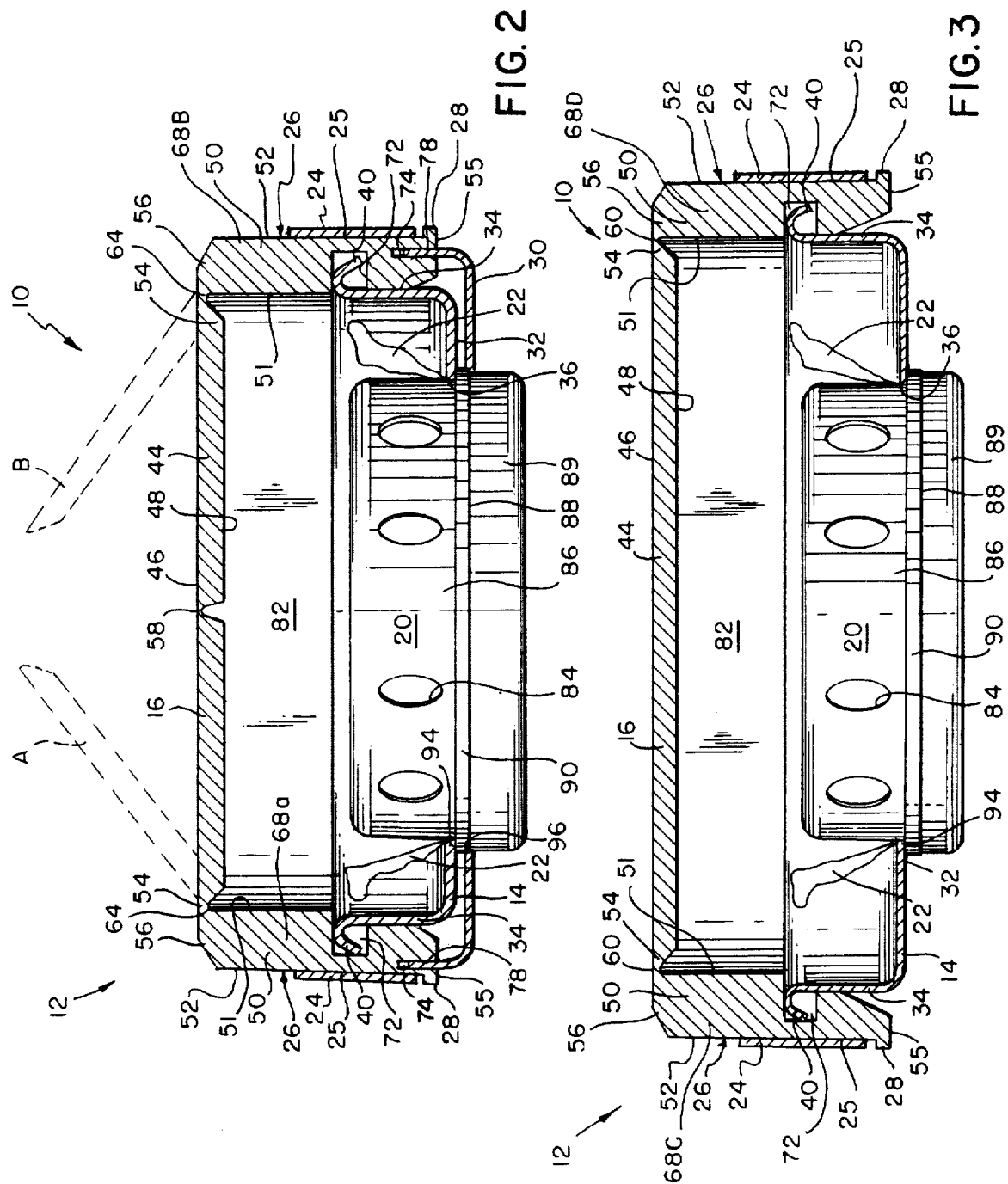

5,520,409

COVER RETENTION IN OCCUPANT RESTRAINT INSTALLATIONS

BACKGROUND OF THE INVENTION

This invention relates generally to systems for the passive restraint of motor vehicle occupants and, more particularly, to cover retention in vehicular occupant restraint module assemblies.

Safety restraint systems which self-actuate from an undeployed to a deployed state without the need for intervention by the operator, i.e., "passive restraint systems" and particularly those, restraint systems incorporating inflatable bags or cushions, and the use of such systems in motor vehicles have been the subjects of much discussion as the desirability of the use of such passive restraint systems has gained general acceptance in the United States.

It is well known to protect a vehicle occupant using a cushion or bag that is inflated with gas, e.g., an "air bag" when the vehicle encounters sudden deceleration, such as in a collision. The term "air bag" is something of a misnomer, however, as during deployment the rapidly evolving gas with which the bag is filled is typically not air but rather an inert gas, e.g., nitrogen. In such systems, the air bag is normally housed in an uninflated and folded condition to minimize space requirements. In an emergency, gas is discharged from an inflator to rapidly inflate the air bag. The air bag, upon inflation, serves to restrain the movement of the vehicle occupant as the collision proceeds. In general, such air bags are commonly designed to be inflated in no more than about 45–60 milliseconds.

Vehicular inflatable restraint systems generally include multiple crash sensors generally positioned about or mounted to the frame and/or body of the subject vehicle and serve to sense sudden decelerations by the vehicle. In turn, the sensor sends a signal to an air bag module or assembly strategically positioned within the riding compartment of the vehicle to actuate deployment of the air bag. In general, the air bag provided for the protection of a vehicle driver, i.e., a driver side air bag, is typically mounted in a storage compartment located in the steering column of the vehicle. Whereas, the air bag for the protection of a front seat passenger, i.e., a passenger side air bag, is typically mounted in the instrument panel/dash board of the vehicle.

Typical occupant restraint systems make use of a module which generally includes an outer reaction housing, also commonly referred to as a reaction canister or "can". The reaction housing or can generally serves to support or contain other components of the occupant restraint module system, including what is referred to as a "air bag inflator" or, more briefly, as an "inflator", or, alternatively, as a "generator" as well as some sort of enclosure cover. The inflator, upon actuation, acts to provide the gas to inflate the air bag.

The inflator is generally either of a pyrotechnic or hybrid type. Pyrotechnic inflators generally contain a gas generating inflate the air bag. In contrast, hybrid type inflators which in material which, upon activation, generates gas which serves to addition to a body of ignitable pyrotechnic material generally contain as the primary inflation gas a stored, compressed gas which is expelled from the inflator upon proper actuation.

The occupant restraint module cover is typically designed to tear along predetermined lines to provide an opening for the expansion of the rapidly inflating air bag.

In view of the generally explosive nature of air bag inflation, a major problem with prior art module assemblies has been a tendency for the occupant restraint cover to detach from the housing during module opening and bag deployment. Should such disassembly occur, the occupant restraint cover or pieces thereof can act as projectiles and harm or injure the occupants.

In the past, various approaches have been proposed and/or employed in an attempt to overcome undesired detachment and/or breaking apart of the cover upon module opening and bag deployment.

For example, U.S. Pat. No. 4,989,897 discloses an apparatus for joining an air bag cover to an air bag housing, referred to therein as "a retainer." The patent discloses that a band of a strong material, such as steel, is fitted over the four side wall flanges of the cover whereby the side wall flanges are clamped to the peripheral wall of the housing. In a first embodiment of the invention, it is stated that the cover is retained on the housing due to the divergence of the peripheral wall of the housing. That the band is made of a strong material, such as steel, results in the band being well able to endure the stresses exerted during deployment. In an alternative embodiment, a steel plate is mounted to the outer surface of each flange of the air bag cover. Rivets (or nuts and bolts) pass through the steel plate, the flanges, and the peripheral wall of the housing whereby the flanges are firmly clamped by the steel plate and the peripheral wall.

In another approach, the plastic cover of the housing assembly is strengthened by embedding a band or mesh of a highly tear resistant material or fabric therein. For example, U.S. Pat. No. 5,064,217 discloses a cover, having an insert embedded therein, for use in conjunction with an inflatable air bag. The insert includes both a flexible net and a flexible reinforcing band assembly. The reinforcing band assembly includes a horizontal band which is coupled, such as by sewing, to the side portion of the net as well as vertical bands which are sewn to the horizontal band and to the side edges of the upper portion and/or the coupling portions of the net.

In general, a problem with such prior approaches is that they are typically relatively expensive to implement and can result in an undesirable, significant increase in the weight of the air bag assembly. Furthermore, such prior approaches tend to complicate the production process as they typically rely either on close fitting pieces or the inclusion of difficult and/or time consuming multiple additional production steps in the air bag assembly fabrication process in order to ensure and effect cover retention.

SUMMARY OF THE INVENTION

A general object of the invention is to provide improved cover retention in occupant restraint module assemblies.

A more specific objective of the invention is to overcome one or more of the problems described above.

The general object of the invention can be attained, at least in part, using a method for retaining a cover to a housing of an occupant restraint module assembly, including the steps of: applying a band of heat shrinkable material about the periphery of said assembly to form a banded assembly, and then heating the banded assembly to effect shrinkage of said band with the shrunk band of material serving to secure said cover to said housing during bag deployment.

The prior art fails to provide a method of cover retention relatively easily adaptable to various module assemblies without the need for extensive modification and/or variation. Further, the prior art in relying on a locking lip retention feature fails to provide an assembly or a method of cover retention adaptable and suited for mold fabrication, particularly through the molding of comparatively less flexible thermoplastic materials.

The invention further comprehends, for use in an occupant restraint module assembly, a method of securing a cover to a housing against radial forces exerted on the assembly during deployment of an air bag. In one embodiment, the occupant restraint module assembly includes a rigid box-like housing having a bottom and a side wall defining a substantially open top. The housing is adapted to contain therewithin an uninflated air bag connected to an inflator to inflate the air bag. The side wall has an outwardly extending rim disposed around at least a portion of the open top. The assembly also includes a moldable plastic snap-on cover closing the top of the housing. The cover has a substantially flat face portion defining therein weakened tear lines adapted to rupture and form release doors under the influence of an inflating air bag and at least one arm portion extending rearwardly from the face portion and adapted to engage with an opposed portion of the housing rim for securing the cover to the housing against axial forces exerted on the assembly during deployment of the air bag. The method for securing the cover to the housing against radial forces exerted on the assembly during deployment of the air bag includes the steps of:

a) applying a band of heat shrinkable material about a retaining band installation area on the periphery of the cover of the assembly to form a banded assembly, and b) heating the banded assembly at a temperature below the autoignition temperature of the inflator to effect shrinkage of the band with the shrunk band of material serving to secure the cover to the housing during bag deployment.

The invention still further comprehends an improvement in an occupant restraint module assembly. In accordance with one embodiment, the assembly includes a rigid box-like housing having a bottom and a side wall defining a substantially open top. The housing is adapted to contain therewithin an uninflated air bag connected to an inflator to inflate the air bag. The side wall of the housing includes an outwardly extending rim disposed around at least a portion of the open top. The assembly also includes a cover closing the top of the housing. The cover has a substantially flat face portion and at least one arm portion extending rearwardly from the face portion and adapted to engage with an opposed portion of the housing rim for securing the cover to the housing against the axial forces exerted on the assembly during deployment of the air bag. The improvement relates to a band of heat shrinkable material applied about a retaining band installation area on the periphery of the cover of the assembly. Upon heating, the band shrinks to secure the cover to the housing against radial forces exerted on the assembly during bag deployment.

The invention also comprehends an occupant restraint module outer assembly which includes a) a rigid box-like housing, b) a moldable plastic snap-on cover, and c) a band of heat shrinkable material to secure the cover to the housing during bag deployment. The housing is generally rigid box-like housing and includes a bottom and a side wall defining a substantially open top. The housing is adapted to contain therewithin an uninflated air bag connected to an inflator to inflate the air bag, with the side wall of the housing includes an outwardly extending rim disposed around at least a portion of the open top. The cover is a generally a moldable plastic snap-on closing for the top of the housing. The cover includes a substantially flat face portion defining therein weakened tear lines adapted to rupture and form release doors under the influence of an inflating air bag and at least one arm portion extending rearwardly from the face portion and adapted to engage with an opposed portion of the housing rim for securing the cover to the housing against axial forces exerted on the assembly during deployment of the air bag. The cover also includes a retaining band installation area about its outer peripheral surface. The band of heat shrinkable material applied about the retaining band installation area of the cover to secure the cover to the housing during bag deployment.

As used herein, references to "forwardly" and "rearwardly" refer to the normal forward and reverse directions of travel of the vehicle in which the subject passive restraint module is attached.

Other objects and advantages will be apparent to those skilled in the art from the following detailed description taken in conjunction with the appended claims and drawings.

BRIEF DESCRIPTION OF THE DRAWINGS

FIG. 1 is a simplified fragmentary cross sectional side view of an inflatable occupant restraint module assembly in accordance with one embodiment of the invention, prior to shrinkage of the retention band.

FIGS. 2 and 3 are simplified cross sectional side views of the inflatable occupant restraint module assembly of FIG. 1 after shrinkage of the retention band and taken substantially along the lines 2—2 and 3—3 of FIG. 1, respectively.

Figure 4:
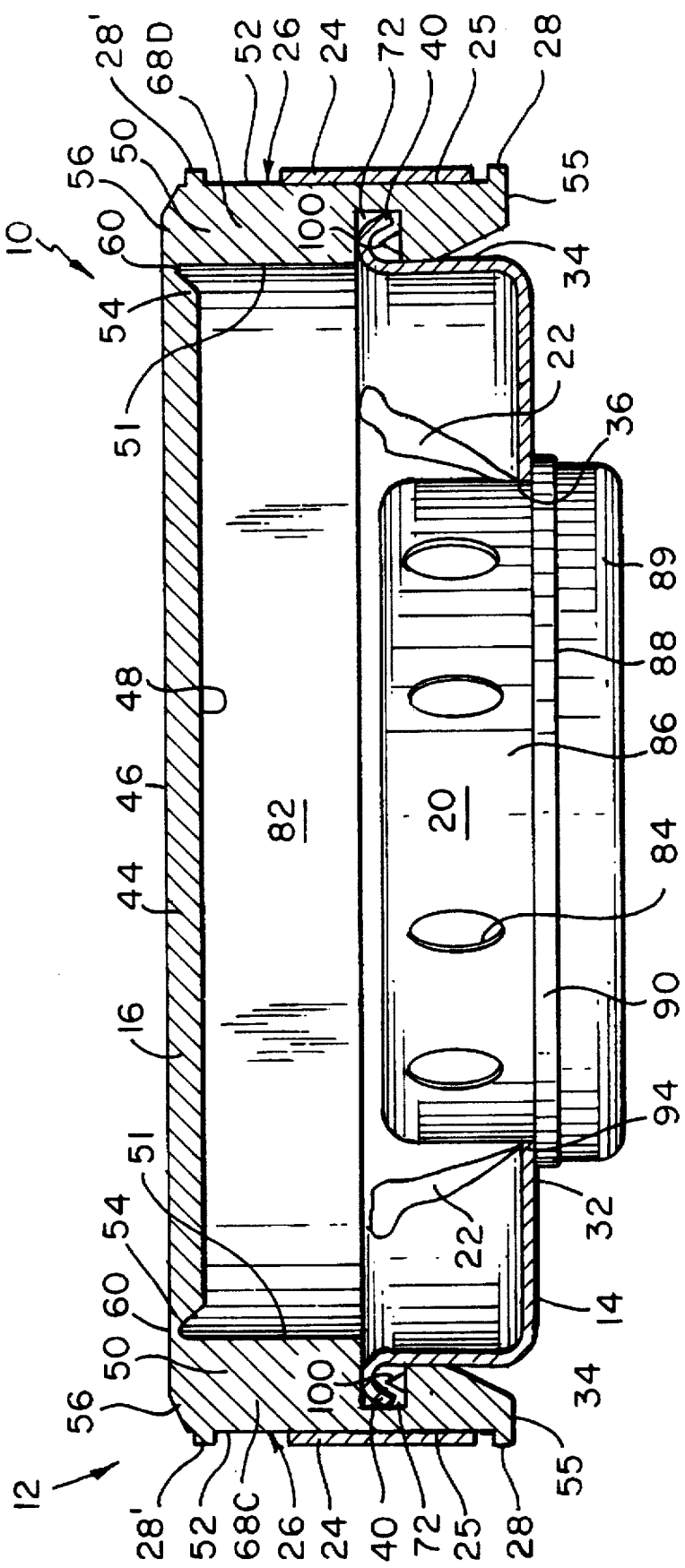
FIG. 4 is a simplified cross sectional side view, similar to FIG. 3, of an inflatable occupant restraint module assembly in accordance with an alternative embodiment of the invention.

For ease of illustration and discussion, the drawings have been simplified by deleting from the illustrated module assembly various of the associated fastening and attachment apparatuses used in conventional assemblies of such modules as they do not form a part of the invention.

DETAILED DESCRIPTION OF THE INVENTION

The present invention, as is described in more detail below, provides improved occupant restraint module assembly cover retention via the utilization of a band of heat shrinkable material about the periphery of the assembly cover. While the invention will be described below with reference to a driver side inflatable restraint module assembly it is to be understood that the invention also has applicability with other types or kinds of inflatable restraint module assemblies including passenger side assemblies.

An inflatable occupant restraint module 10 is illustrated in FIGS. 1–3, with FIG. 1 showing the assembly prior to shrinkage of the retention band and FIGS. 2 and 3 showing the assembly with a properly shrunk retention band, in accordance with the invention. The module 10 includes an outer assembly 12 which includes a supporting member, specifically a reaction housing 14, and a cover 16. As will be described in detail below, the housing 14 is adapted to be press fit in the cover 16. The housing also serves as a base onto which are mounted an inflator 20 and an air bag 22, shown in FIGS. 2 and 3 in fragmented form to avoid complicating the drawings.

It is noted that FIG. 1 includes, as a point of reference, a showing of the X, Y, and Z axes, to depict three dimensional representation. As used herein, the term "axial forces" is used in reference to a force with a component along the Z axis. The term "radial force" is used in reference to forces that act only in the X-Y plane. Thus, it is to be understood that when speaking in terms of a driver side module assembly, for example, axial forces are those that act in the plane of the assembly and the driver.

A band of heat shrinkable material 24, as will be described in more detail below, is about a retaining band installation area 25 formed about the outer periphery 26 of the outer assembly 12, specifically of the cover 16, adjacent a retaining flange 28 thereabout. The band 24 serves to assist in the retention of the cover 16 to the housing 14 before, and especially during and after bag deployment such as occurs upon proper activation of the inflatable occupant restraint system, as in response to the onset of a collision.

The illustrated inflatable occupant restraint module 10 also includes a retaining bracket 30 for further securing the cover 16 to the reaction housing 14. It is to be understood that the invention can generally be practiced without the inclusion of supplementary retaining aids, such as such a retaining bracket. However, in extremely high performance inflatable occupant restraint module assemblies (i.e., those assemblies that commonly produce relatively high internal pressures prior to the opening of the module for bag deployment). It is to be understood that, the use of such supplementary retaining aids may be desired to provide an additional measure of assurance of cover retention upon actuation of the restraint system.

The retaining bracket 30, typically, can also be employed, in a known manner, as a bracket for the attachment of the module 10 to the spokes of the steering wheel of the subject vehicle.

The reaction housing 14 is generally rectangular and deep dish-like in shape. It is to be understood that while the practice of the invention is not limited to use in conjunction with reaction housings made of particular materials of construction, because of a desire to practically reduce and/or minimize the cost and weight of the assembly, reaction housings are typically made of steel or, preferably, aluminum either in a formed, cast or extruded shape. It is to be further understood that the construction of the reaction housing using other suitable materials of construction such as molded plastic, for example, are also contemplated.

The housing includes a bottom 32 and side wall portions 34. The bottom 32 includes an opening 36 therein adapted for the insertion of the inflator 20. A recurved rim 40 occurs at the extreme edge of the side wall portions 34.

The cover 16 generally serves to enclose the housing 14 and the air bag 22. Consequently, the cover is generally shaped to correspond to the shape of the selected housing. Thus, in the case of a rectangular shaped housing, the cover generally also has a rectangular shape. The cover 16 includes an upper wall portion 44 having a substantially flat face portion, i.e., an outer surface 46 and an inner surface 48 as well as a side wall portion 50, having an inner surface 51 and an outer surface 52, extending downward from the periphery 54 of the upper wall portion 44. In general, the upper wall portion is thinner than the side wall portion.

As identified above, the retaining band installation area 25 formed about the outer periphery 26 is adjacent to the retaining flange 28, shown as extending about the outer surface 52 at the lower end 55. If desired, additional band retaining aids can be incorporated into the assembly design.

For example, an additional retaining flange, shown as in phantom as item 28', can be used at the upper end 56 of the outer surface 52. In this way, the retaining flanges can be used to cooperatively bracket the band of heat shrinkable material therebetween so as to minimize slippage or movement of the band.

As shown, the upper wall portion 44 is provided with a break-open area of an H-like shape defined by a center tear seam 58 and side tear seams 60. These tear seams are formed as cover areas of reduced thickness and are thus referred to as "weakened". The center tear seam 58, as shown, is approximately centered on the upper wall portion 44. The side tear seams 60 run generally perpendicular to the center tear seam 58 and adjacent to opposing side walls of the cover 16.

When the air bag is inflated, the weakened tear lines or seams rupture and the upper wall divides and forms two separate release doors (A and B) that open outwardly and oppositely each other, bending around hinge lines 64 as best seen in FIG. 2 (with the doors shown in phantom in an open position) to allow the air bag 22 to expand to provide the desired occupant protection function. The hinge lines 64 comprise narrow thinned areas of the inner side of the upper wall portion 44.

In the illustrated embodiment, the side wall portion 44 comprises four, independently moveable, locking arms 68 extending rearwardly from the outer surface 46 of the upper wall portion 44 and are integrally molded therewith. Each of the locking arms is independently identified by way of inclusion of a capital letter (i.e., A, B, C, and D) with the reference part numeral. As shown, the locking arms are connected by flexible side wall connector portions 70 which permits independent movement of each of the locking arms for ease of mounting the cover 16 to the housing 14.

One set of locking arms 68A and 68B are shown in FIG. 2. They are on opposite sides of the housing 14 and each includes a notch 72 (shown as a square cut notch), for receiving the rim 40, and a reentrant recess 74. The retaining bracket 30 which is mounted on the bottom 32 of the housing 14 includes a pair of retaining clips 78 which enter the recesses 74 and serve to assist in the retaining of the cover 16 in position.

The thus received housing sidewall rim serves as a means of securing the cover to the housing against axial forces, such as may be exerted on the assembly during deployment of the air bag.

A second pair of locking arms 68C and 68D project from the cover 16 substantially orthogonal to the retained locking arms 68A and 68B. Each of the locking arms 68C and 68D, like the locking arms 68A and 68B, defines a notch 72 which engages the rim 40 of the housing 14. These locking arms 68C and 68D may be further retained by the retaining bracket 30, if desired.

As shown, the lower ends 55 of the locking arms 68, i.e., those ends opposite the cover upper wall portion 44, are appropriately beveled, as may be desired to facilitate assembly. It is to be understood, however, that if desired the invention can be practiced using a cover with ends not so beveled.

Normally, the air bag 22 is folded and fills the space 82 between the inflator 20 and the cover 16. When initiated, as in response to the onset of a collision, the inflator 20 rapidly produces gas to inflate and expand the bag 22 to a typically spherical form. To that end a plurality of radial gas exit ports 84 are provided in an upper portion 86 of the inflator 20. In addition to the upper portion 86, the inflator 20 is illustratively additionally composed of an intermediate portion 88 and a lower portion 89. The inflator 20 includes a flange 90 provided on the intermediate portion 88 thereof for facilitating the attachment of the inflator 20 to the reaction housing 14. In practice, such attachment can be realized by simply inserting the inflator upper portion 86 into the reaction housing opening 36 until the flange 90 abuts the peripheral region 94 of the reaction housing 14 adjacent the opening 36. Also, as will be readily apparent such a flange can be used to facilitate the attachment of the inflator to a gas inlet port or opening of an air bag. In addition, the retaining bracket 30 has an opening 96 of such size as to allow the inflator lower portion 89 to pass therethrough but not to allow the passing through of the flange 90.

Nylon 66 and rayon are examples of heat shrinkable materials that can be used in practice of the invention. In general, due to the nature of the application, it will be preferred that the heat shrinkable material be one that the temperature at which the shrinkage is affected will be below the autoignition temperature of the inflator, particularly when the invention is practiced in conjunction with pyrotechnic inflators.

While the size of the band of heat shrinkable material can vary dependent upon the particular application and size of module assembly, in general, the band can have a width of about 10–15 millimeters and a thickness of about 1–1½ millimeters.

The band of heat shrinkable material is applied about the outer assembly at the end of the assembly process, e.g., after the assembly of the air bag and inflator into the module and application of the cover about the housing. The band of heat shrinkable material is typically applied so as to loosely fit around the housing. The entire housing is then heated so as to affect the desired heat shrinkage of the heat shrinkable material. Such shrinkage can be affected by placing the assembled module into an oven at heat shrink conditions, including temperature and time. While the length of time in the oven and the operating conditions of the oven will vary dependent upon the specific heat shrinkable material used and the extent of shrinkage desired, in normal practice an oven cycle time of no more than about 1 minute will typically be needed to affect the desired shrinkage when using heat shrinkable materials such as nylon 66 and rayon and heating is effected at appropriately elevated temperatures.

In the practice of the invention generally sufficient around the module hoop strength is provided by the band of heat shrinkable material so as to secure the cover to the housing such as against the radial forces exerted on the assembly upon module opening and during bag deployment. Thus, the invention has been described above with reference to assemblies having module covers which do not include a locking lip, e.g., a lip or mound portion, to engage with the rim 40 of the housing 14 and prevent detachment of the cover from the housing. It is to be understood, however, that the invention does not preclude the use of such locking lips. Thus, if desired, the invention can be practiced in conjunction with assemblies utilizing such locking lip engagements. FIG. 4 shows a locking lip 100.

It is noted, however, that the use of module assemblies which do not incorporate such a locking lip dramatically facilitates the production of the module cover, since production of module covers not having such locking lips is more conducive to fabrication by molding. Furthermore, less expensive, injection molded thermoplastic materials can more easily be used for cover fabrication and the cover can be a molded homogeneous member in that no reinforcements need be molded into it. A high pressure injection molding material, such as a thermoplastic is preferred. Thus, thermoplastic elastomers (i.e., "TPE's") having relatively high toughness and preferably having relatively constant material properties over the reaction conditions can be used in cover fabrication Thermoplastic olefins (i e., "TPO's"), because of relatively low cost, are cover fabrication materials believed to be particularly suited for use in conjunction with the practice of the invention. Particularly preferred cover materials for use in conjunction with the practice of the invention include TPO's having material properties which exhibit low thermal sensitivity. An especially preferred material would be a terpolymer elastomer made from ethylene-propylene diene monomer such as SANTOPRENE (a trademark of Monsanto Company).

It is also to be understood that while the band of heat shrinkable material will typically form a loop such as to resemble a rubber band, about the periphery of an assembly, the band of heat shrinkable material will generally not be visible in the installed module assembly. For example, as will be appreciated by those familiar with such assemblies in driver side installations the periphery of the assembly and any such band thereabout would in typical installations be enveloped by the steering wheel shroud and thus the band would not be visible in the installed assembly.

While the invention has been described above in reference to use in conjunction with a snap-on type moldable plastic assembly cover it is to be understood that the invention is not so limited and can be used in conjunction with not only other types or forms of covers but also with covers prepared from various materials of construction.

The invention illustratively disclosed herein suitably may be practiced in the absence of any element, part, step, component or ingredient which is not specifically disclosed herein.

The foregoing detailed description is given for clearness of understanding only, and no unnecessary limitations are to be understood therefrom, as modifications within the scope of the invention will be obvious to those skilled in the art.

What is claimed is:

1. A method for retaining a cover in an occupant restraint module assembly, said method comprising the steps of:
    applying a band of heat shrinkable material about the periphery of the assembly comprising a reaction housing, an inflator, an uninflated air bag and the cover to form a banded assembly, and
    heating the banded assembly to effect shrinkage of said band with the shrunk band of material serving to secure said cover to said housing during bag deployment.

2. The method of claim 1 wherein said cover is a snap-on cover comprising moldable plastic, with said cover having a substantially flat face portion defining therein weakened tear lines adapted to rupture and form release doors under the influence of an inflating air bag and at least one arm portion extending rearwardly from the face portion and adapted to engage with an opposed portion of the housing for securing the cover to the housing against axial forces exerted on the assembly during deployment of the air bag.

3. The method of claim 2 wherein said moldable plastic comprises an injection molded thermoplastic olefin.

4. The method of claim 1 wherein said housing comprises a rigid box-like structure having a bottom and a side wall defining a substantially open top with the housing adapted to contain therewithin the uninflated air bag connected to the inflator to inflate the air bag and with the side wall having an outwardly extending rim disposed around at least a portion of the open top.

5. The method of claim 1 wherein said heating step is conducted at a temperature below the autoignition temperature of the inflator.

6. The method of claim 1 wherein said band of heat shrinkable material comprises nylon 66.

7. The method of claim 1 wherein said band of heat shrinkable material comprises rayon.

8. The method of claim 1 wherein said shrunk band of heat shrinkable material is effective to secure the cover to the housing against radial forces exerted on the assembly during deployment of the air bag.

9. A method for cover securement in an occupant restraint module assembly including a rigid box-like housing having a bottom and a side wall defining a substantially open top with the housing adapted to contain therewithin an uninflated air bag connected to an inflator to inflate the air bag and with the side wall having an outwardly extending rim disposed around at least a portion of the open top, and a moldable plastic snap-on cover closing the top of the housing, the cover having a substantially flat face portion defining therein weakened tear lines adapted to rupture and formrelease doors under the influence of an inflating air bag and at least one arm portion extending rearwardly from the face portion and adapted to engage with an opposed portion of the housing rim for securing the cover to the housing against axial forces exerted on the assembly during deployment of the air bag, said method for securing said cover to said housing against radial forces exerted on the assembly during deployment of the air bag and comprising the steps of:

applying a band of heat shrinkable material about a retaining band installation area on the periphery of said moldable plastic cover of said assembly to form a banded assembly, and heating the banded assembly at a temperature below the autoignition temperature of the inflator to effect shrinkage of said band with the shrunk band of material serving to secure said cover to said housing during bag deployment.

10. The method of claim 9 wherein said moldable plastic comprises an injection molded thermoplastic.

11. The method of claim 10 wherein said thermoplastic comprises a thermoplastic olefin.

12. The method of claim 9 wherein said band of heat shrinkable material comprises nylon 66.

13. The method of claim 9 wherein said band of heat shrinkable material comprises rayon.

14. In an occupant restraint module assembly including a rigid box-like housing having a bottom and a side wall defining a substantially open top with the housing adapted to contain therewithin an uninflated air bag connected to an inflator to inflate the air bag and with the side wall having an outwardly extending rim disposed around at least a portion of the open top, and a cover closing the top of the housing, said cover having a substantially flat face portion and at least one arm portion extending rearwardly from the face portion and adapted to engage with an opposed portion of the housing rim for securing the cover to the housing against the axial forces exerted on the assembly during deployment of the air bag, the improvement which comprises:

a band of heat shrinkable material applied about a retaining band installation area on the periphery of said cover of said assembly and adjacent at least one retaining flange, which band upon heating shrinks to secure said cover to said housing against radial forces exerted on the assembly during bag deployment.

15. The improvement of claim 14 wherein said band of heat shrinkable material comprises nylon 66.

16. The improvement of claim 14 wherein said band of heat shrinkable material comprises rayon.

17. An occupant restraint module outer assembly comprising:

a rigid box-like housing having a bottom and a side wall defining a substantially open top with said housing adapted to contain therewithin an uninflated air bag connected to an inflator to inflate said air bag and with said side wall having an outwardly extending rim disposed around at least a portion of said open top, an injection molded thermoplastic olefin snap-on cover closing for said top, said cover having a substantially flat face portion defining therein weakened tear lines adapted to rupture and form release doors under the influence of an inflating air bag and at least one arm portion extending rearwardly from the face portion and adapted to engage with an opposed portion of said housing rim for securing said cover to said housing against axial forces exerted on said assembly during deployment of the air bag, said cover having a retaining band installation area about its outer peripheral surface, and a band of heat shrinkable material applied about said retaining band installation area to secure said cover to said housing during bag deployment, said band being subjected to heating to effect shrinkage thereof.

18. The assembly of claim 17 wherein said housing and cover additionally comprise a locking lip means of engagement.

19. The assembly of claim 17 wherein said housing and cover lack a locking lip means of engagement.

20. The method of claim 1 wherein said housing includes a bottom and a side wall defining a substantially open top with the side wall having an outwardly extending rim disposed around at least a portion of the open top and with said cover adapted to engage with an opposed portion of the housing rim for securing the cover to the housing against the axial forces exerted on the assembly during deployment of the air bag wherein said assembly lacks a locking lip means of engagement between said housing and said cover.

\* \* \* \* \*

UNITED STATES PATENT AND TRADEMARK OFFICE
CERTIFICATE OF CORRECTION

PATENT NO. : 5,520,409
DATED : 28 May 1996
INVENTOR(S) : Davin G. Saderholm

It is certified that error appears in the above-indentified patent and that said Letters Patent is hereby corrected as shown below:

At column 1, line 13, "systems" and" should be
--systems", and--.

At column 1, line 14, "those, restraint" should be
--those restraint--.

At column 1, line 53, ""generator  as" should be
--"generator", as--.

At column 1, lines 57-60,
"Pyrotechnic inflators generally contain a gas generating inflate the air bag. In contrast, hybrid type inflators which in material which, upon activation, generates gas which serves to addition"

should be
--Pyrotechnic inflators generally contain a gas generating material which, upon activation, generates gas which serves to inflate the air bag. In contrast, hybrid type inflators which in addition--.

At column 6, lines 1 and 2,
"shown as in phantom as item 28'," should be
--shown in FIG. 4 as item 28',--.

UNITED STATES PATENT AND TRADEMARK OFFICE
CERTIFICATE OF CORRECTION

PATENT NO. : 5,520,409
DATED : 28 May 1996
INVENTOR(S) : Davin G. Saderholm

It is certified that error appears in the above-indentified patent and that said Letters Patent is hereby corrected as shown below:

At column 9, line 25, "formrelease doors" should be --form release doors--.

Signed and Sealed this

Tenth Day of December, 1996

BRUCE LEHMAN

Attest:

Attesting Officer

Commissioner of Patents and Trademarks